(No Model.) 11 Sheets—Sheet 1.
J. BALL.
ENVELOPE MACHINE.

No. 409,624. Patented Aug. 20, 1889.

Witnesses:
C. C. Moulton
G. M. Chamberlain.

Inventor
James Ball
By Chaffin, Atty.

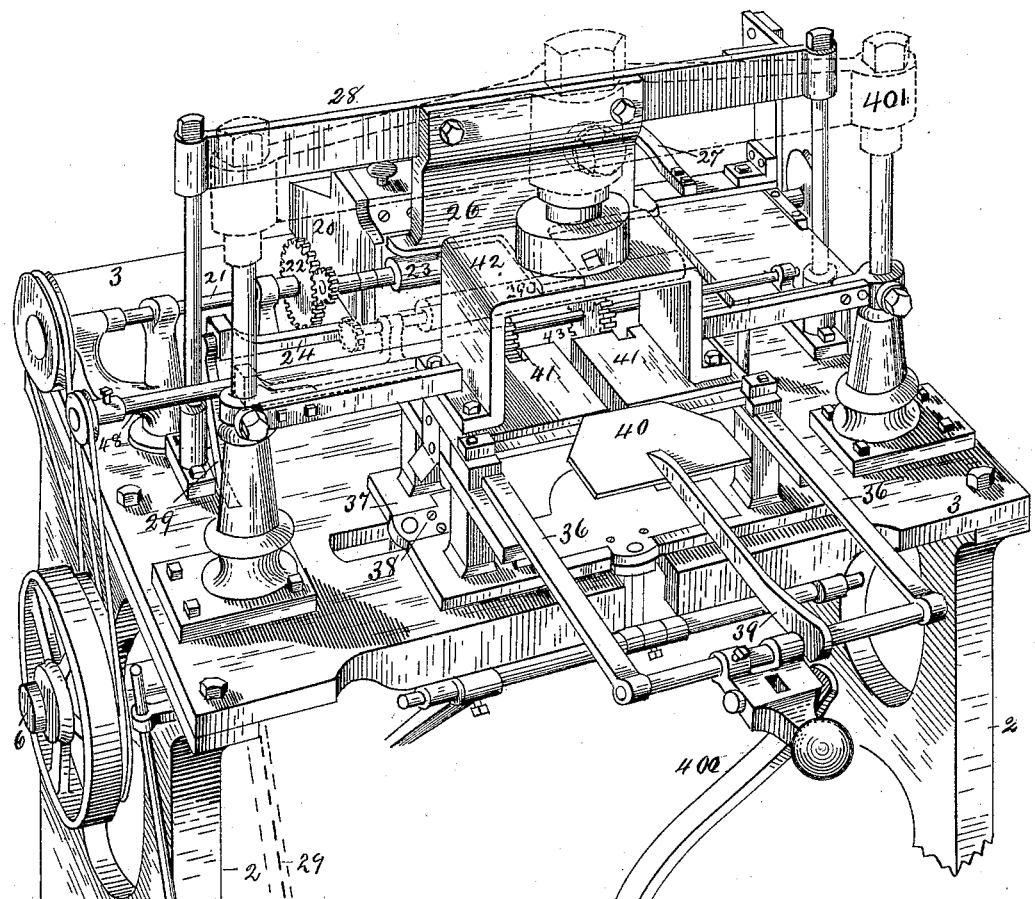

(No Model.)  J. BALL.  11 Sheets—Sheet 3.
ENVELOPE MACHINE.
No. 409,624.  Patented Aug. 20, 1889.
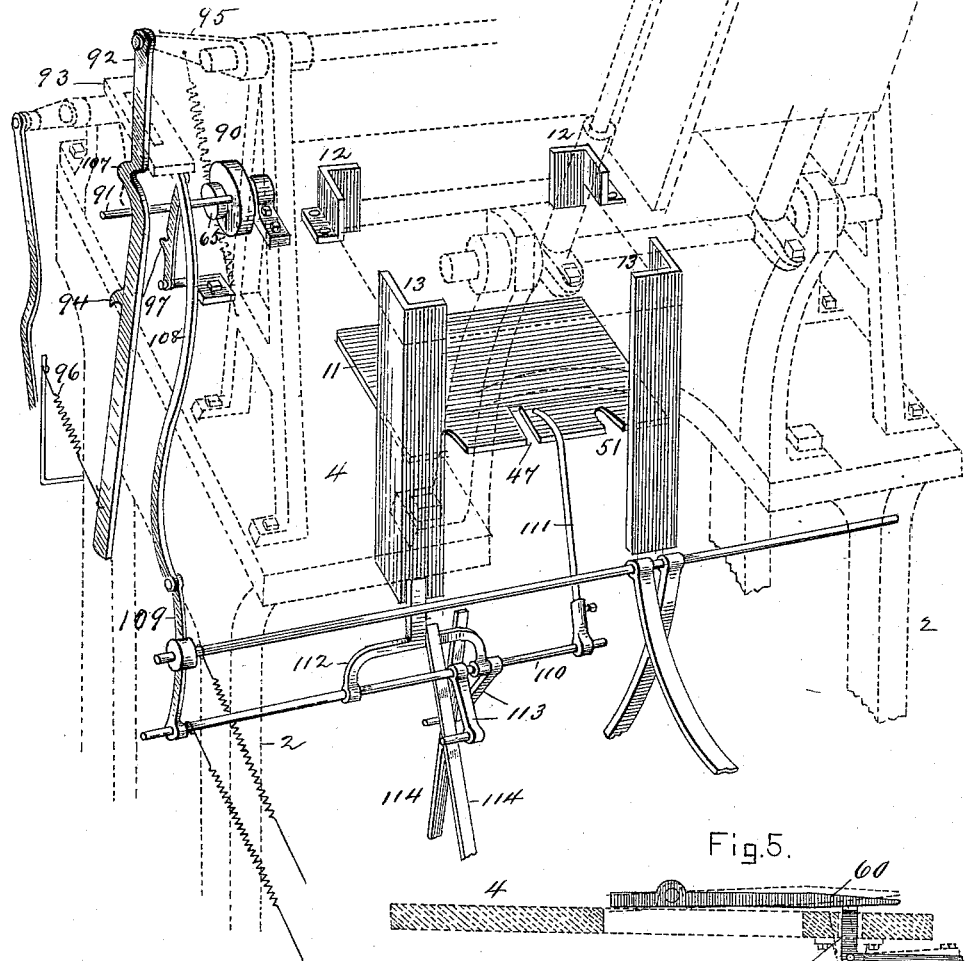

(No Model.) 11 Sheets—Sheet 4.
J. BALL.
ENVELOPE MACHINE.
No. 409,624. Patented Aug. 20, 1889.
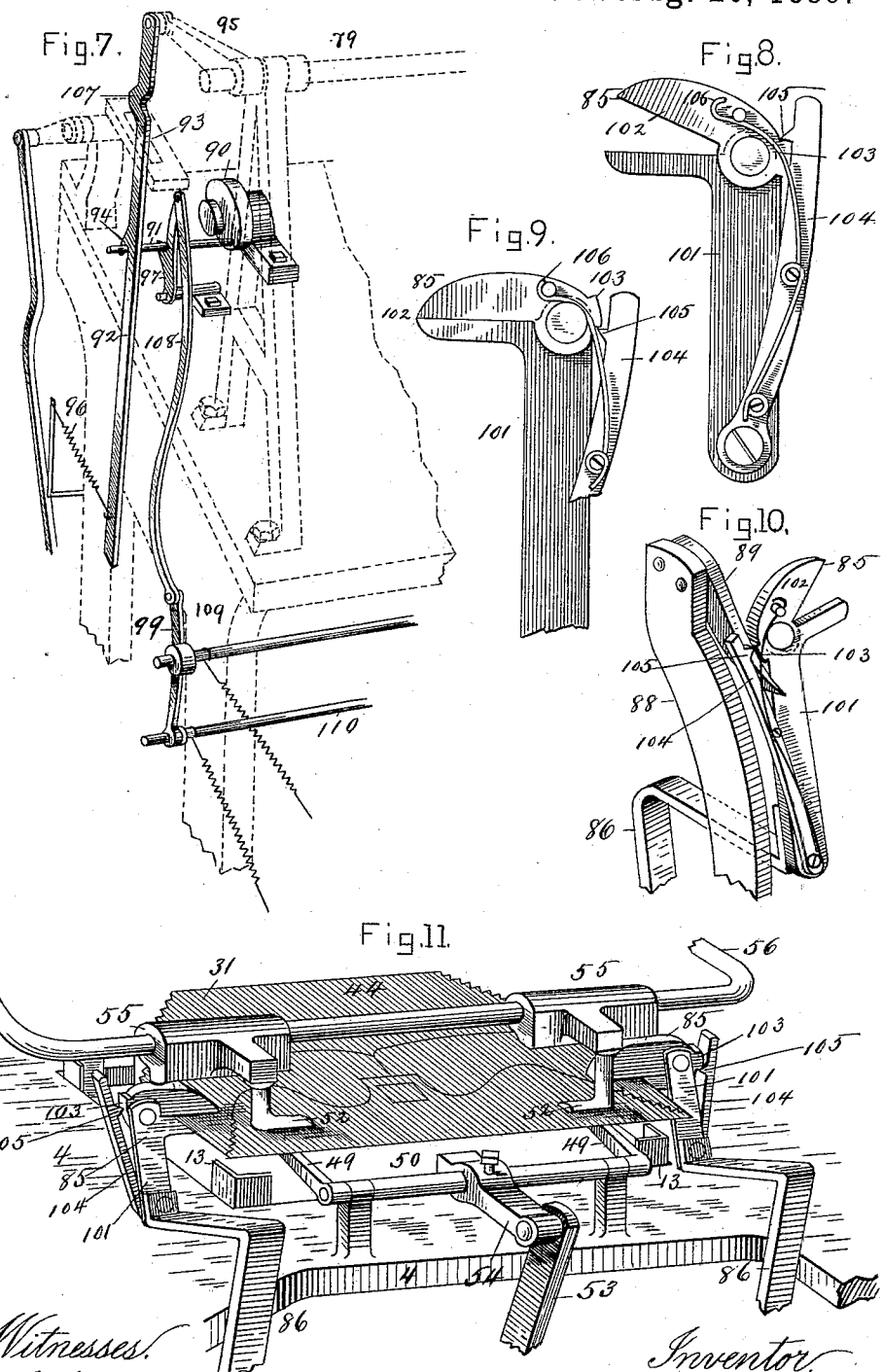

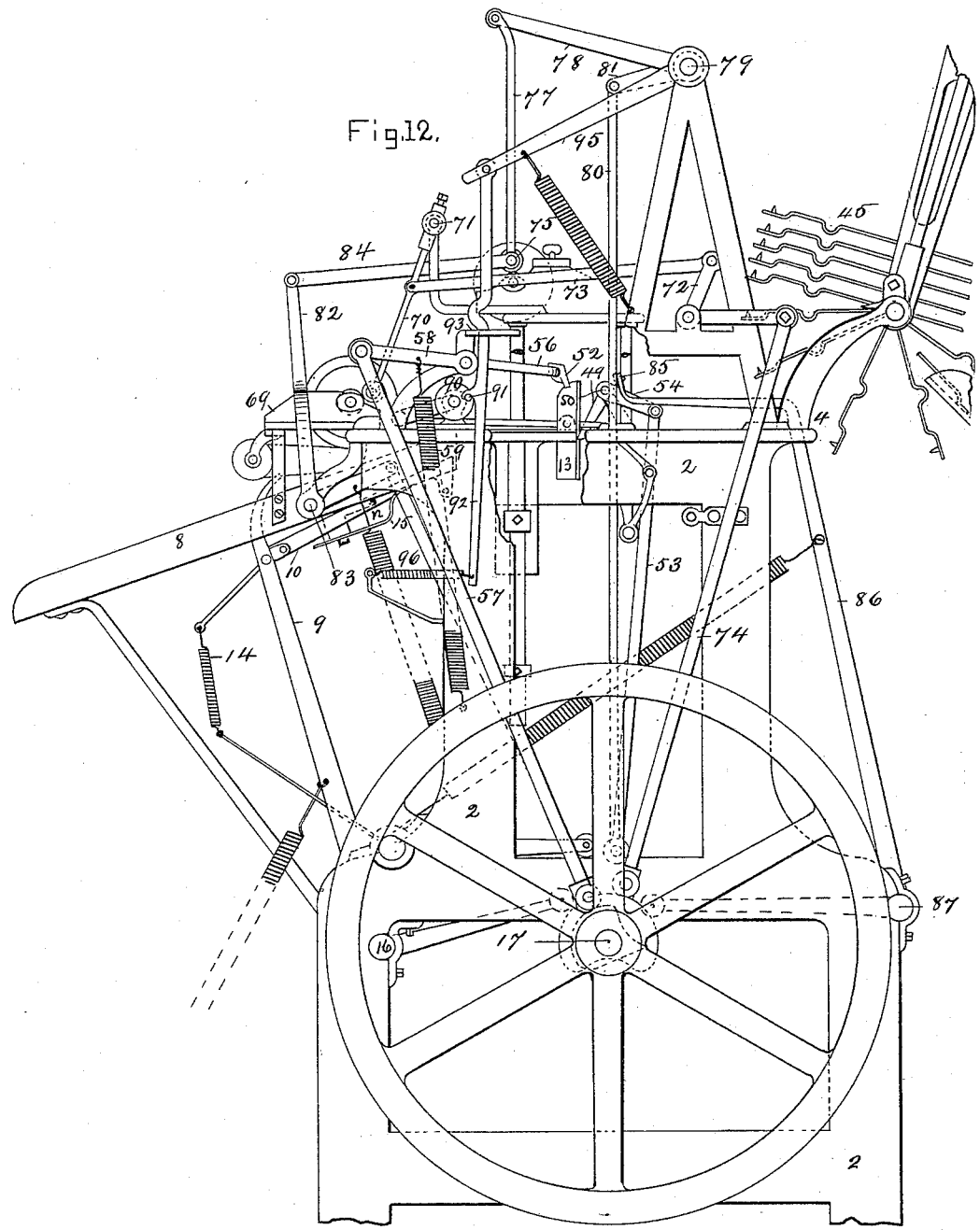

(No Model.) 11 Sheets—Sheet 6.
J. BALL.
ENVELOPE MACHINE.
No. 409,624. Patented Aug. 20, 1889.
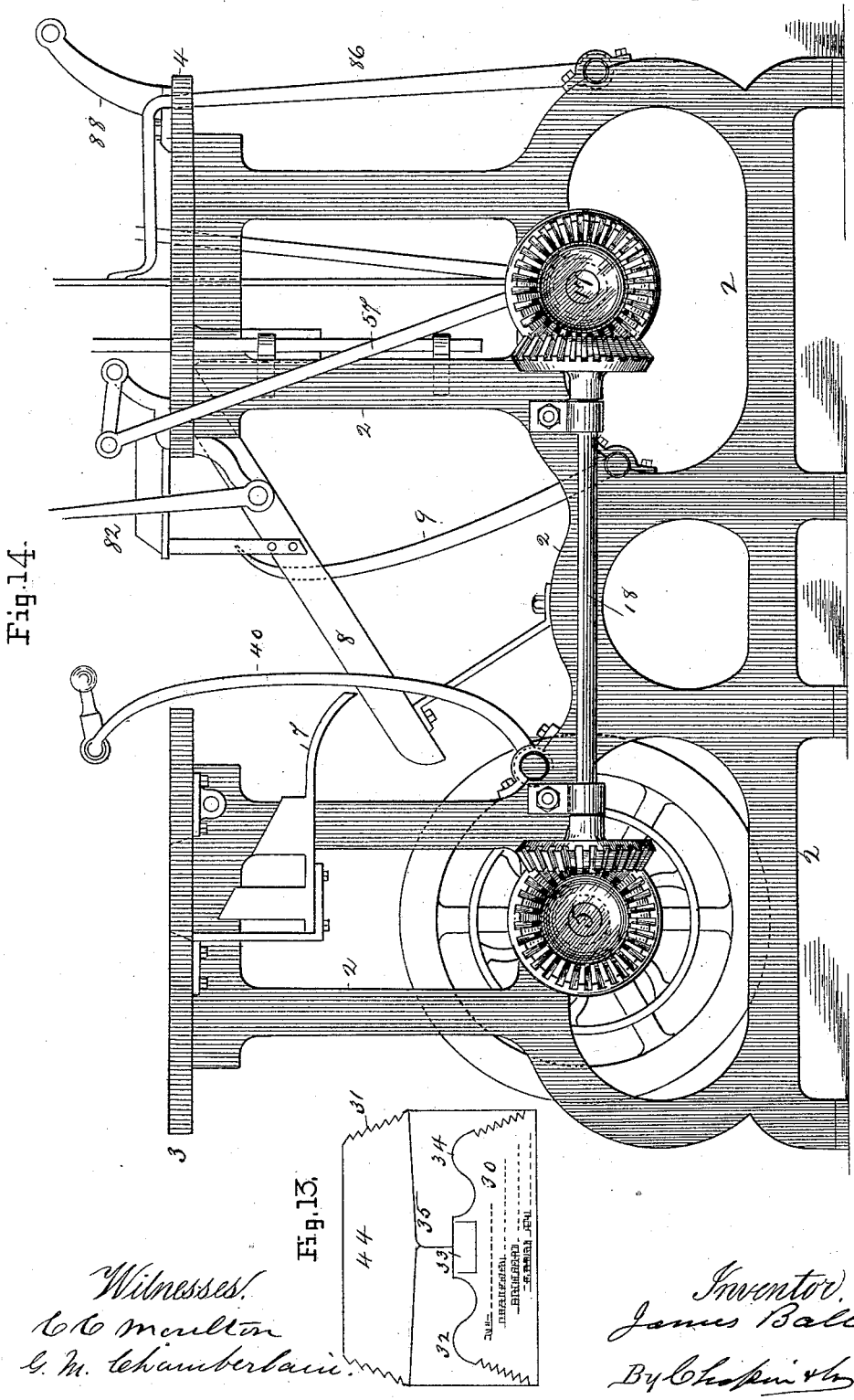
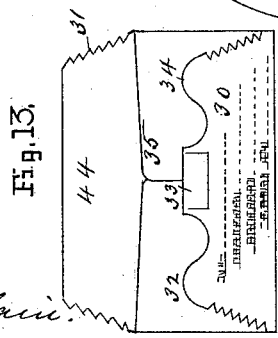

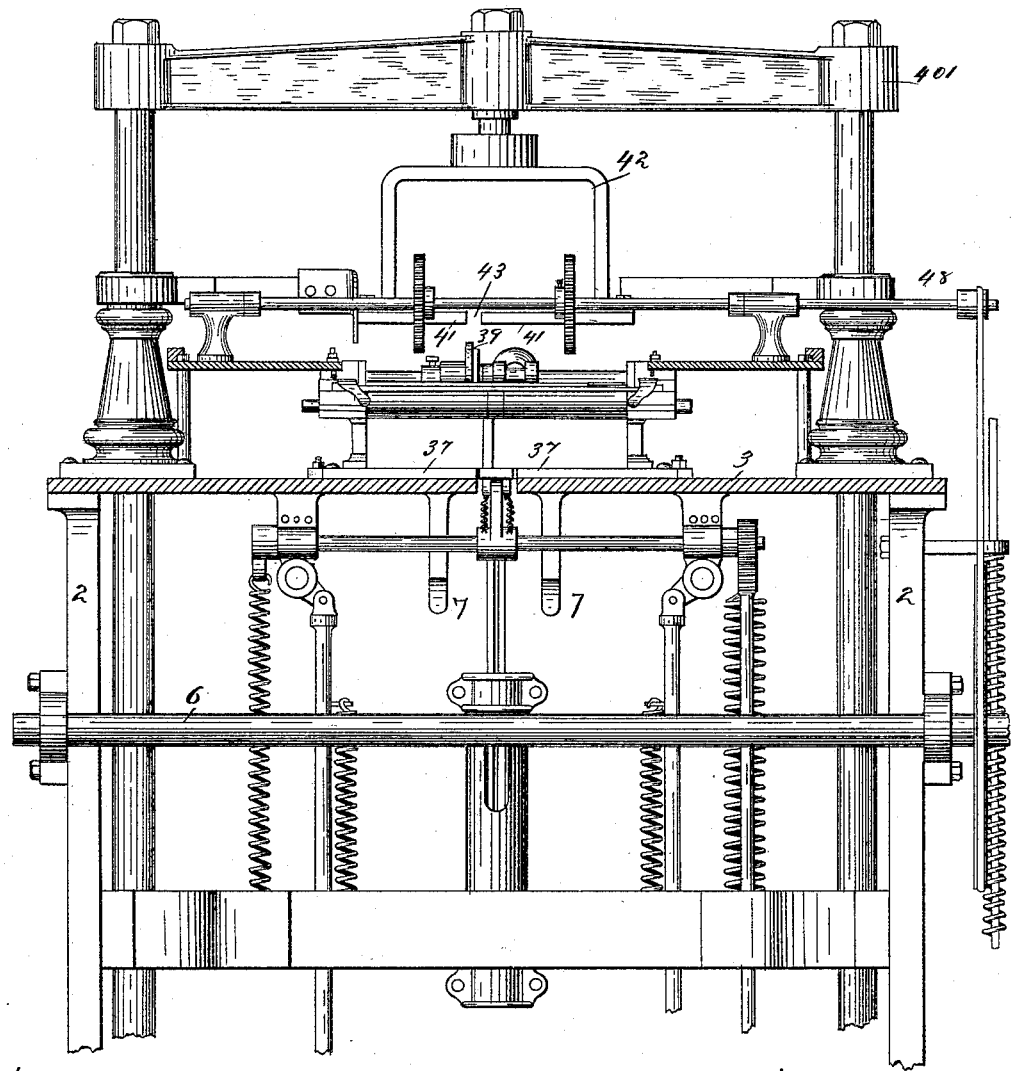

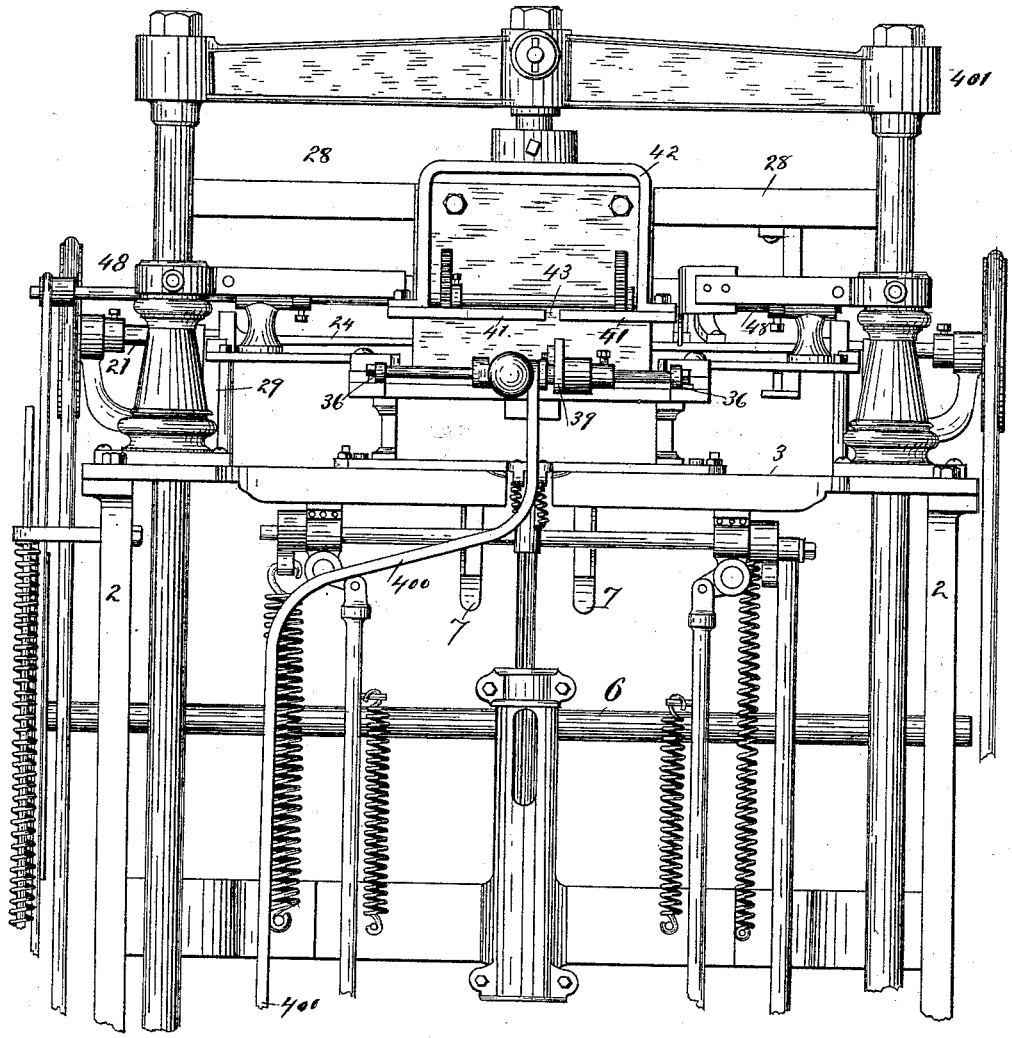

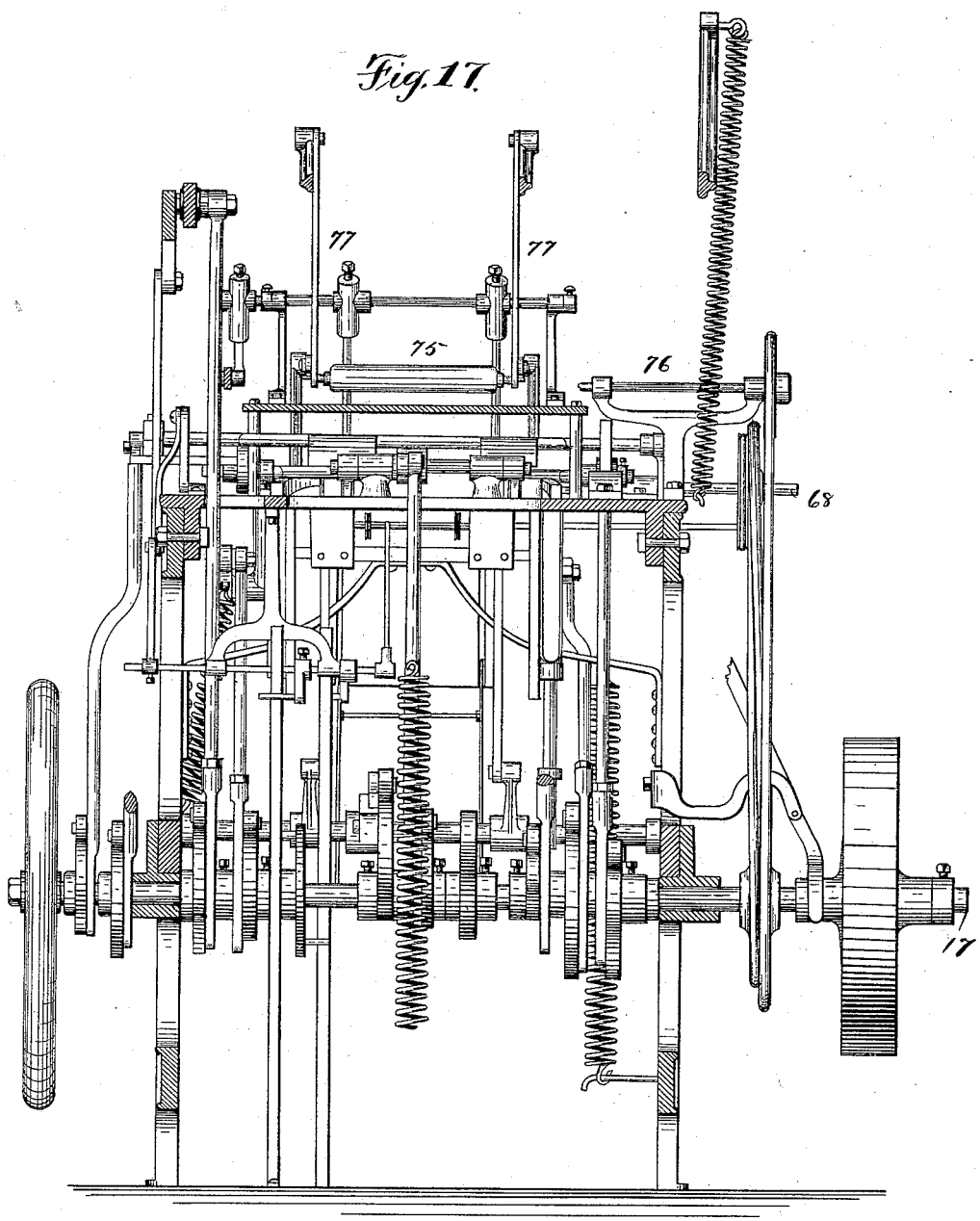

(No Model.) 11 Sheets—Sheet 11.

J. BALL.
ENVELOPE MACHINE.

No. 409,624. Patented Aug. 20, 1889.

Witnesses: Inventor.
Wm. F. Chapin James Ball
G. M. Chamberlain. By Chapin & Co.
  att'ys

UNITED STATES PATENT OFFICE.

JAMES BALL, OF HOLYOKE, MASSACHUSETTS, ASSIGNOR TO THE HOLYOKE ENVELOPE COMPANY, OF SAME PLACE.

ENVELOPE-MACHINE.

SPECIFICATION forming part of Letters Patent No. 409,624, dated August 20, 1889.

Application filed March 8, 1886. Serial No. 194,377. (No model.)

*To all whom it may concern:*

Be it known that I, JAMES BALL, a citizen of the United States, residing at Holyoke, in the county of Hampden and State of Massachusetts, have invented new and useful Improvements in Envelope-Machines, of which the following is a specification.

This invention relates to envelope-machines, the object being to provide an improved machine for gumming and folding the peculiar description of envelope known as "registered package envelope," patented June 4, 1878, No. 204,422; and the improvements pertain to the peculiar organization of devices required for gumming the end, back, and seal flaps of said envelope and folding the same, all as hereinafter fully described, and pointed out in the claims.

Figure 1:
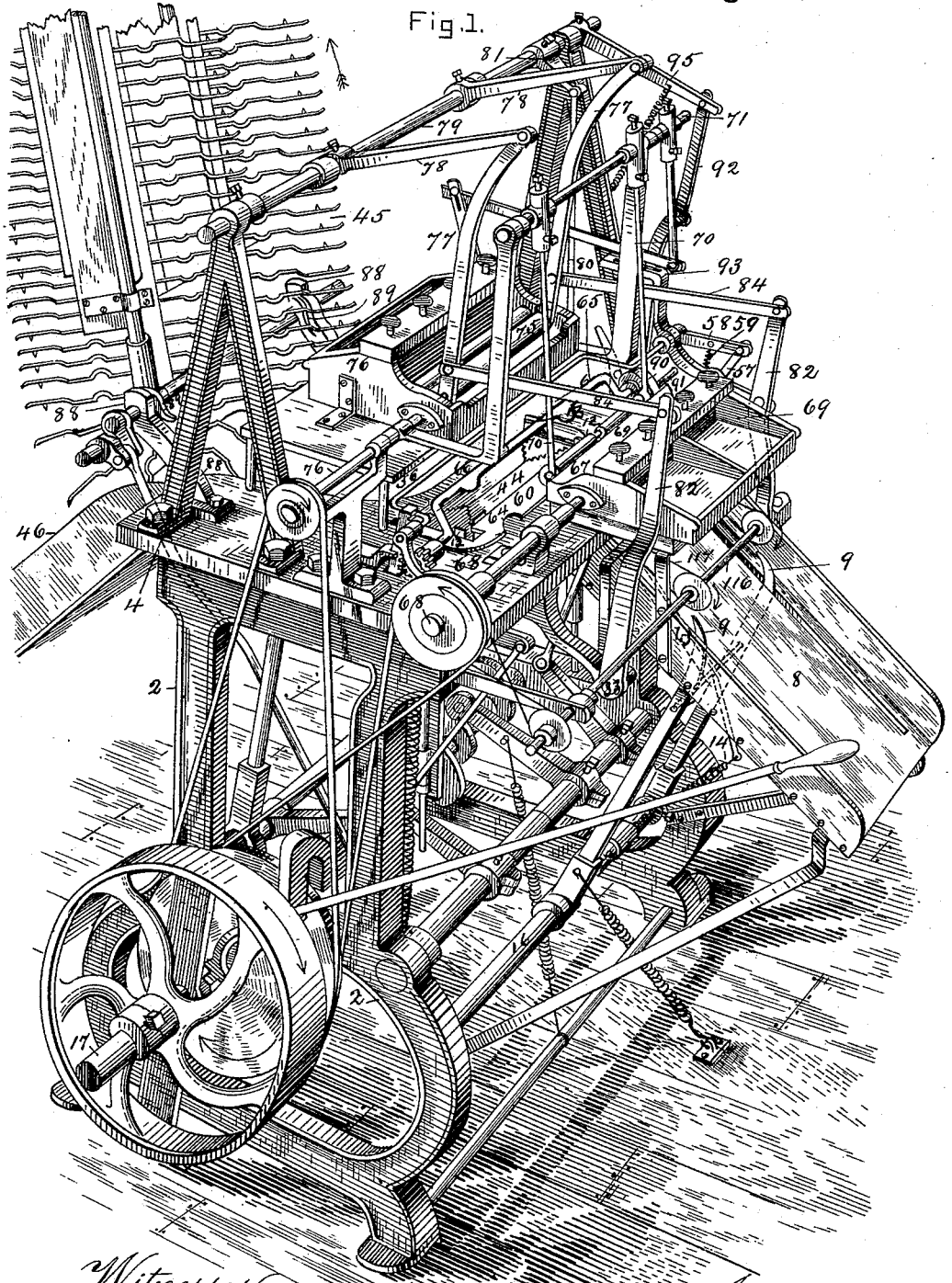
Figure 18:
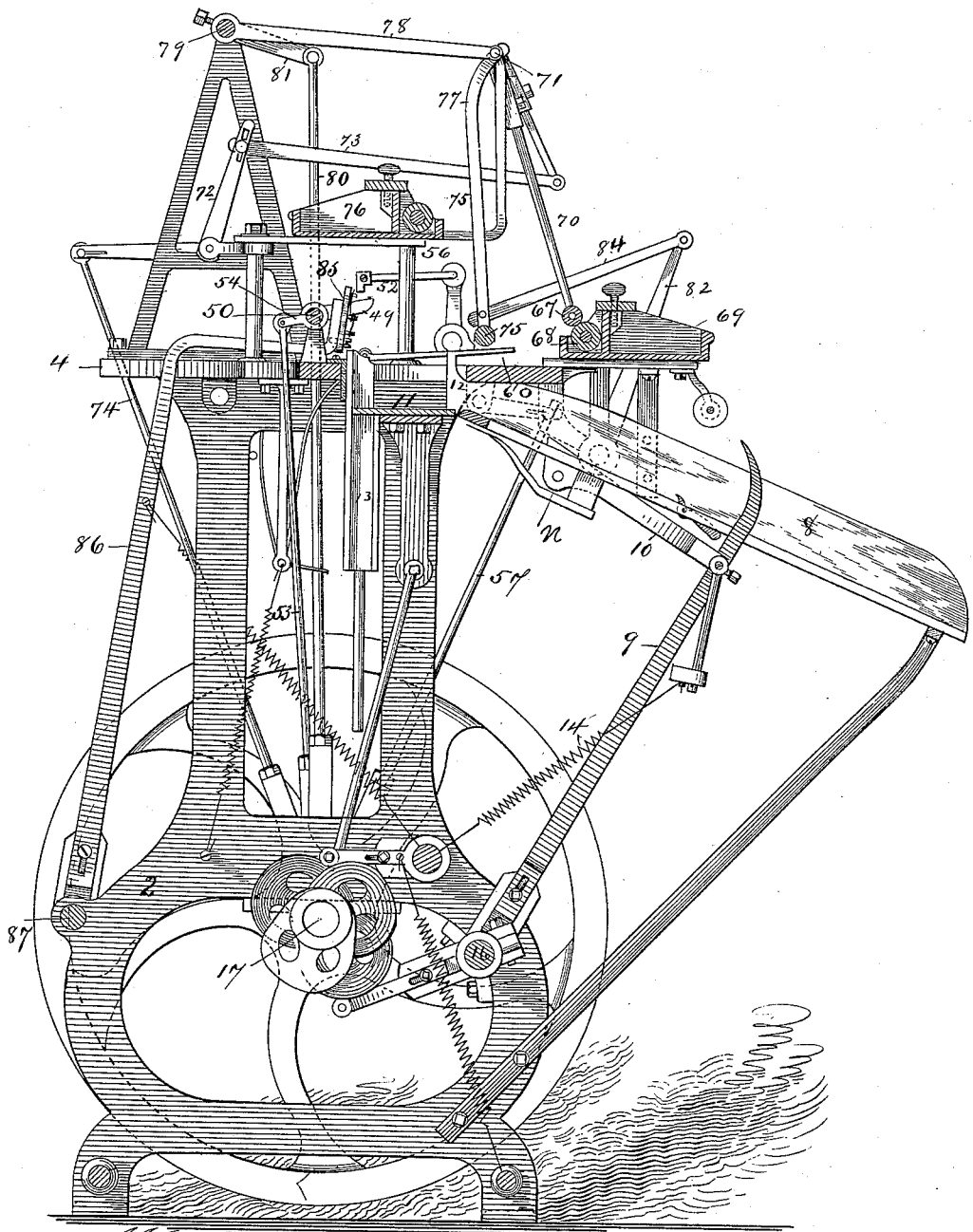
Figure 12:
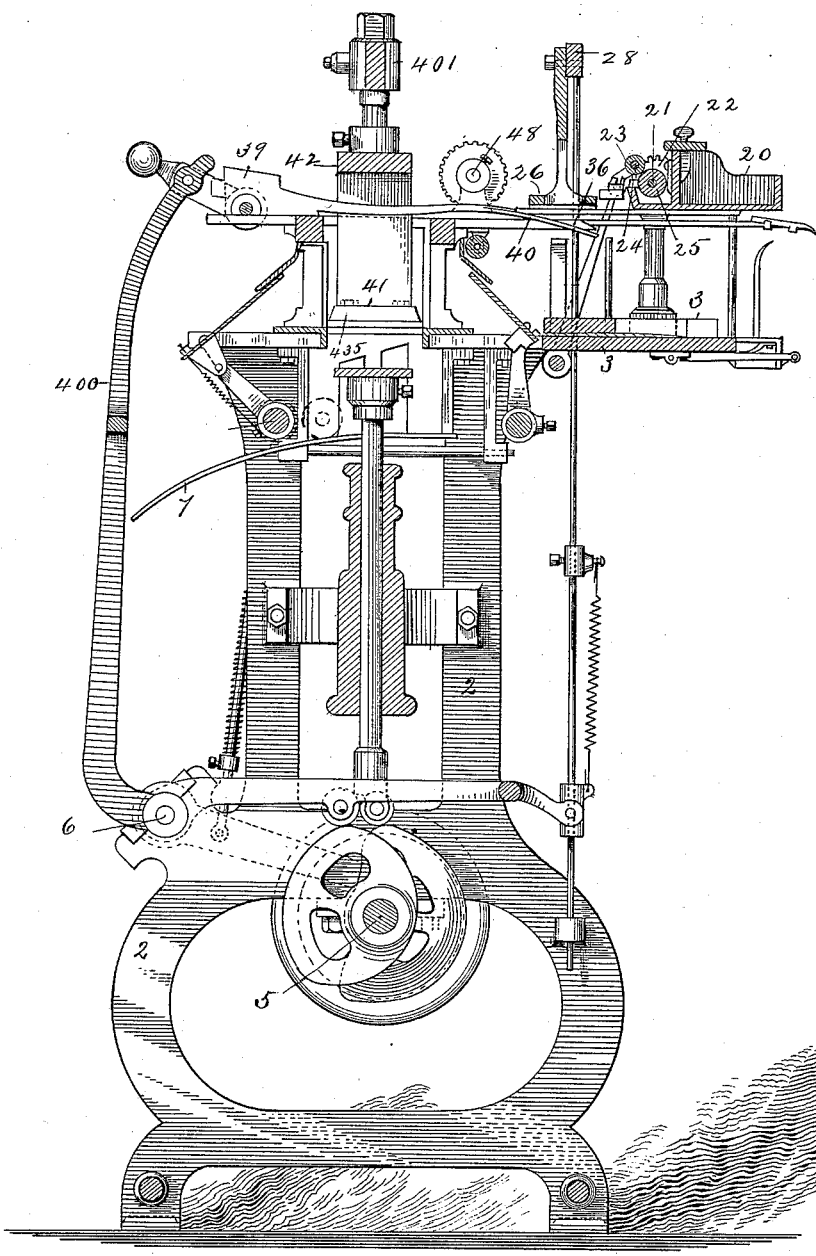

Figures 2 and 1 are perspective views of co-operating sections or divisions of an envelope-machine embodying my improvements, Fig. 1 being a front oblique and Fig. 2 a rear oblique view, the former showing a part of the envelope-drying chain connected therewith.
Fig. 3 is a perspective view from the rear of a portion of Fig. 2, showing one end of the main picker, its operating-bar, and the gumming devices, the opposite end being broken off, said figure showing in dotted lines the position of the main picker-gumming roller when moved away from the gum-box to gum said picker. Fig. 4 is a perspective view of the stop-motion mechanism embodied in Fig. 1, showing the table of the machine and certain parts of the frame of the latter, as hereinafter described, in dotted lines. Fig. 6 is a perspective view of the front edge of the table of the machine, Fig. 1, and of the vibrating flap-bed pivoted thereon, together with the immediately-actuating mechanism thereof, shown in full and in dotted lines, said figure showing also the upper ends of the front vertical envelope-guides. Fig. 5 is a transverse section through the table and flap-bed, Fig. 4, showing in end view the devices for vibrating said bed. Fig. 7 is a perspective view of a portion of the stop-motion mechanism illustrated in Fig. 4, but showing certain parts thereof in the positions which they occupy when the flap-gumming devices are stopped. Figs. 8, 9, and 10 illustrate in side elevations and in perspective the envelope-grippers, Fig. 9 showing one shut, Fig. 10 showing the upper end of one arm of the swinging frame to which the grippers are attached and a part of an arm on the table of the machine to which the gripper-opener is attached. Fig. 11 is a rear perspective view of that portion of the table of the machine, Fig. 1, directly under which the envelope-lifter operates, showing above said table the mechanism by which the envelope is raised and held in position when the grippers take it, and the means for closing the latter, the upper ends of both of said swinging gripper-arms with grippers thereon and an envelope just seized by the latter being shown in said figure. Fig. 12 is a side elevation of the division of the machine, Fig. 1. Fig. 13 is a plan view of the envelope above referred to. Fig. 14 is a side elevation of the united frame of said two divisions of the machine, much of the working mechanism being omitted. Fig. 15 is a vertical cross-section of the table 3 shown in Fig. 2, and part of the mechanism mounted thereon, the view being taken just in rear of the bar 401, Fig. 2. Fig. 16 is a front elevation of the same, Fig. 2, looking in reverse direction. Fig. 17 is a vertical cross-section of that part of the machine shown in Fig. 1, the section being taken just in front of the cam-shaft 17, and parts being omitted for clearness of illustration. Fig. 18 is a vertical longitudinal section nearly central of Fig. 1, parts being omitted for perspicuity. Fig. 19 is a similar section of Fig. 2, with omissions.

It will be understood that in many of the figures some parts are necessarily omitted or broken away and elsewhere shown in detail, the complex character of the machine making clear illustration on a small scale very difficult.

In the drawings the two divisions of the machine are shown in Figs. 1 and 2 separated, in order that the parts thereof may be illustrated upon a scale sufficiently enlarged to show clearly their construction and relative relations; but in practice said divisions constitute one machine having their frames united, as shown in Fig. 14, the main shafts of the two said divisions being connected by a shaft and bevel-gears, as there shown.

In the drawings, 2 indicates the frame and 3 4 the tables of the machine, the former that of the first division, Fig. 2, and the latter that of the second division, Fig. 1, said divisions being so designated because they act on the envelope-blank in that order.

In Fig. 2, 5 is the driving and cam shaft of the machine, rotary motion being given thereto by a suitable belt, and connection is made by like means between said driving-shaft and a roller-shaft 6, on which is a roller co-operating with another roller, both located under the folding-box of the machine to take the folded envelopes from the latter and compress their folds. Said rollers are indicated in dotted lines, Fig. 19, and they are located so as to drop the envelope onto the chute 7, Fig. 14, from whence it moves onto the trough 8 and is dropped onto the latter when the feed-arms 9 (Figs. 1, 12, and 14) are at the lower end of said trough, and they carry it up in conjunction with pivoted arms 10, Fig. 12, hung on a cross-bar between said feed-arms, and push the envelope onto the slotted envelope-lifter 11, Fig. 4, opposite the corners of which are the vertical envelope-guides 12 13, the latter being located at the rear of the table 11 and adapted to stop the envelope and hold it in proper position to be lifted up. The aforesaid arms 10, one of which is shown in dotted lines in Fig. 1 and one in full lines in Figs. 12 and 18, have their upper ends held up in the slots in trough 8, in which the arms 9 move (but in advance of the latter) by the spring 14, attached to the end of an arm on the said cross-bar between arms 9, a curved guide-strip 15 under trough 8 serving to guide the ends of arms 10 downward when they move backward, whereby said ends pass under and back of an envelope which arms 9 have moved up and move said envelope upward in advance of the next one carried by arms 9. A pin or projection in at one side of one of the arms 10 engages the lower face of the strip 15 to guide the arms 10 downward during the backward movement, the movement being a common one in feed-pawls. The arms 9 are hung on a rock-shaft 16, to which motion is imparted by a suitable connection with the cam-shaft 17, Figs. 12 and 18, said shaft in Fig. 1 being shown with a driving-pulley thereon to indicate means for driving the same independently of the shaft 18 and the gearing shown in Fig. 14. The shaft 116, extending over trough 8, has thereon two pulleys, over which cords 117 run, and the latter serve to hold the seal-flap of the envelope down as it passes up said chute.

In Fig. 2 the cam-shaft 5 is not shown extended across the machine under the table thereof. This division of the machine is, with the exception of the below-described improvements which have been added to it to adapt it to the manufacture of said special envelope, substantially such as is shown in the patent to Reay, August 25, 1863, No. 39,702.

In Figs. 2 and 19, 20 is the gum-box, having a roller 25, as usual, rotating therein in the gum, which roller is attached to the shaft 21, and on the latter is a gear 22.

The picker-gumming roll 23 is hung in bearings on the horizontal bar 24, and on the shaft of roll 23 is a pinion engaging with said gear 22. The main picker 26 and the small picker 27 are both attached to the picker-bar 28, the latter having a reciprocating vertical motion by a suitable connection with the cam-shaft in the usual way. (See Fig. 19.) The bar 24, on which the gumming-roller 23 is hung, has a reciprocating horizontal motion imparted to it by a vibrating arm 29, attached to each end of said bar, motion being imparted to the latter by suitable connection with the cam-shaft of the machine. By the said movement of bar 24 the roll 23 is carried under and against the lower end of the picker 26, gumming the latter and its horizontally-projecting arm 290. (Shown partly broken off in Fig. 3 and in dotted lines in Fig. 2.) The small picker 27 is gummed by any mechanism common in this class of machines. The said picker 26 strikes and gums the inner side of the back flap 30 of the envelope 31, Fig. 13, below the laps 32 33 34 and the center lap 33. At the same time and by the same movement of the cross-head 28 the small picker 27 is carried against and gums the inner side of the end flap 35 of the blank, and said two pickers, when they rise up, lift up said blank so that the carriage 36 passes under it, and, engaging with it in the usual way, draws it backward over the usual folding-box 37, one of the wings of which 38 is shown in Fig. 2. The shaft 48, having thereon two pinions, as shown, is rotated by a belt-connection with shaft 6, and as the blank is carried under said pinions the latter rotate in close proximity to laps 32 34 of the envelope and prevent them from turning up and striking the plunger 41 as the blank passes under it. The blank for the aforesaid envelope is of such extraordinary large size, and the paper from which it is necessarily made is so much heavier than that ordinarily used, that it is found indispensable to provide in a machine for gumming and folding said blank some means for supporting the central part of the blank while its ends rest upon the carriage 36 and during its movement from under the pickers to the folding-box, and it is also requisite, in order to obviate too slow motions of the machine, that said means for holding up the central part of the blank shall not in any way interfere with the regular reciprocating motions of the folding-plunger, and to this end the carriage 36 has attached to its rear cross-bar the rigid arm 39, having the plate 40 on the free end thereof, or having the end of said arm made wide. The said carriage has the usual reciprocating motion over the folding-box 37 by means of the vibrating arm 400, which has the usual connection with a rock-shaft on the lower part of the machine. When the carriage moves forward to engage with a blank, as aforesaid, the plate 40 is carried under the center of the latter, and the blank is held in a level position by the carriage and said plate while it is being carried over the folding-box; but while the blank is being drawn back the folding-plunger 41 must move up in order to be ready to move downward against the blank as soon as the latter arrives over the folding-box, and also must the carriage and plate 40 move forward while said plunger is in the folding-box. Therefore said plunger is made in two parts, as shown, each of which is secured to the opposite ends of a yoke 42, thereby forming a slot 43 through said plunger, and a passage for plate 40 above the latter, which permit the plunger to move vertically while arm 39 is over the folding-box, and plate 40 to be carried forward through yoke 42 above the plunger while the latter is in the folding-box. Said plunger-yoke is attached to a vertically-reciprocating cross-head 401, (shown in dotted lines in Fig. 2,) in the usual manner. The said blank 31 has the under sides of the laps 32 and 34 gummed before it is placed on the machine, and a pile of blanks so prepared is placed on table 3, Fig. 3, under the pickers 26 and 27, from whence they are taken one by one by the latter, whereby the gum is applied to the inside of the back-flap 30 and to the same side of the central lap 33, (the latter by the arm 290 on picker 26,) and they are folded and delivered through the bottom of the folding-box 37 onto the chute 7, Fig. 14, which is located under said folding-box, in the condition shown by the envelope 31, Fig. 13, excepting that the seal-flap 44, which is there shown open, is folded against the outer sides of the laps 32, 33, and 34, and in this condition the envelopes are fed one by one up the trough 8, Figs. 1 and 14, on to the envelope-lifter 11. (Shown in Fig. 4, and hidden in Fig. 1 by an envelope shown thereon under the gumming devices.)

That part of the machine which receives the envelope, as just described, applies the gum first to the outside of the seal-flap thereof 44, at points thereon directly opposite the ends of the laps 34, and in such manner as to conform to the shape of said laps, to the end that the gummed surface on the outside of said seal-flap shall not extend beyond the borders of said laps when the edge of the flap is placed under the latter and they are gummed thereupon; and, secondly, following the above-mentioned gumming operation, the seal-flap 44 is folded outward to bring its inner side upward, and then gum is applied thereto nearly over its whole surface; and, finally, the envelope is seized by grippers and carried from the envelope-lifter 11 into the drying-chain 45, from which it is dropped into the chute 46, where the finished envelopes are gathered and bound into packages containing a convenient number. The said envelope-lifter has a slot 47 in its rear edge, for a purpose hereinafter described, and is supported under the envelope 31 (shown in Fig. 1) on a post which rests on a cam on shaft 17, whereby said lifter is given a vertical reciprocating motion. At the deposit of each envelope on said lifter by the arms 9 and their co-operating parts, as hereinbefore described, said lifter rises from the position shown in Fig. 4 to about that indicated in Fig. 1, the rise being equal to the height of the envelope 31 there shown, and immediately following said movement of the lifter the two ends of the arms 49, Fig. 11, attached to the rock-shaft 50, swing upward through the slots 51 in the rear edge of said lifter against the envelope, raising the rear edge of the latter off from the lifter and carrying it up against the stop-arms 52, same figure, the lifter meanwhile dropping to receive another envelope. Said shaft 50 is given its rocking motion by the connecting-rod 53, which is pivotally attached to arm 54 on said shaft, and whose lower end rides on a suitable cam on shaft 17. The arms 49 remain in said position but an instant, or just long enough to hold the envelope in place while its seal-flap is being gummed, as below described, and immediately said arms, together with the arms 52, rise slightly higher to bring the envelope in the track of the grippers below described. (See Fig. 18.) Said arms 52 are rigidly attached to the sleeves 55, having thereon rearward projections, as shown, and said sleeves are fixed on the crank-shaped shaft 56, the ends of the latter being hung in suitable bearings on table 4, Fig. 1, and a suitable vibratory motion imparted thereto by the connecting-rod 57, which is attached to the arm 58 on said shaft. (See Fig. 12.) Said connecting-rod has one end riding on a suitable cam on shaft 17, whereby it is given an upward movement, and a spring 59 attached to said arm draws the latter downward and holds the end of said rod against said cam.

While the envelope is held by the arms 49 and 52, as above described, its seal-flap is gummed as follows: It will be remembered that said seal-flap at this stage of the operation lies on the ends of the laps 33 34. A flap-table 60 is hung on table 4, as shown in Fig. 1, and its front edge is lifted by the swinging lever 61, which is pivoted on table 4 under table 60, the free end of said lever acting against the inclined under side of said table, as shown in Figs. 5 and 6. A vibratory motion is given to lever 61 by the elbow-lever 62, to one arm of which the lever 61 is connected, and lever 62 is given a rocking motion by the connecting-rod 63, whose lower end rests on a suitable cam on shaft 17. The front edge of table 60 is provided with two circular recesses 64, (see Figs. 1 and 6,) having somewhat the form of the envelope-laps 34, and said front edge swings by gravity against table 4 of the machine. A crank-shaft 65 is hung in suitable bearings on table 4, Fig. 1, and extends over the flap-table 60, and has thereon the circular short arms 66, which, by the motion of shaft 65, are rocked downward into said recesses 64 in table 60, and then upward to the position shown in Fig. 1. Said crank-shaft 65 has on one end a pinion, as shown in Fig. 1, with which a vertically-reciprocating rack (also there shown) engages, whereby shaft 65 is given said rocking motion, said rack being actuated by suitable connection with a cam on shaft 17. The said arms 66 on shaft 65 are picker-gummers, and apply the gum to the outer surface of the seal-flap of the envelope at two separate points, as follows: The gumming-roll 67 takes gum from a roll on shaft 68, which roll rotates in the gum-box 69, in the usual manner. The gumming-roll 67 is hung on the lower ends of two arms 70, which are attached to a shaft 71, and the latter is given a rocking motion by its connection with the vibratory elbow-lever 72, Fig. 12, through the rod 73, said elbow-lever being connected to the rod 74, which is given a reciprocating endwise motion by a suitable cam on shaft 17. When said picker-gummers 66 lie within the recesses 64 in the vibrating table 60, the face of the latter drops down below the plane of the face of said gummers, (an envelope at this instant rising up back of table 60,) and while there the gumming-roll 67 swings over said gummers, applying gum thereto. Immediately after, shaft 65 swings up and over, carrying the gummed face of the gummers 66 against the outside of the seal-flap of the envelope, applying gum thereto and becoming adhesively attached to said flap thereby, and instantly said gummers swing back to their place of starting, opening out said seal-flap and laying it over the face of the table 60, which then rises up to a level with said gummers, and at this instant the gumming-roll 75, which has a vertical and a horizontal reciprocating motion, is carried over the inside of the seal-flap of the envelope, gumming the latter. Said gumming-roll 75 takes gum from the gum-box 76 and is hung in the ends of the rods 77, which are pivotally attached to the arms 78 on the rock-shaft 79, whereby the gumming-roll 75 is given its vertical motion, shaft 79 being given its rocking motion by the rod 80, connected to arm 81 on said shaft, rod 80 being given a vertical reciprocating motion by its connection with a suitable cam on shaft 17. The horizontal reciprocating motion of the gumming-roller 75 is imparted to it by the connection of the lower ends of the said rods 77 with the arms 82 on a rock-shaft 83 by the rods 84. Immediately that the inside of said seal-flap has been gummed, as just described, the grippers 85 swing forward opposite each end of the envelope, as shown in Fig. 11, and catching the latter quickly draw it backward (the arms 49 and 52 at this instant moving away from the envelope and releasing it) and deposit it in the drying-chain 45, the latter having an intermittent motion around suitable shafts in the usual manner. Fig. 11 illustrates the envelope in position between the said arms 49 and 52, showing its seal-flap 44 opened out as it is when it is gummed, and also shows the position of the grippers at the moment they seize the envelope. The gripper 85 consists of the bar 101, having the rigid jaw-piece thereon, and having the jaw 102 pivoted to its upper end and adapted to open and close opposite said fixed jaw-piece. Said jaw 102 has the projection 103 on its rear end, and a latch 104 is pivoted on bar 101, having a pointed projection 105 thereon. A spring 106 is attached to the side of said latch, whose upper end is hook-shaped and extends under a pin in jaw 102, which serves to open jaw 102 and to swing said latch. Said grippers are secured on the upper side of two vibrating arms 86, (see Figs. 11 and 12,) which are secured on a rock-shaft 87, and the latter is given a rocking motion by a suitable cam on shaft 17, with which an arm (dotted lines, Fig. 12) on said shaft engages. At a proper time the arms 86 swing the grippers (then being open, as shown in Fig. 10) toward the envelope, carrying the fixed-jaw part of the gripper under the end of the envelope, as shown, and bringing the pivoted jaw 102 into engagement with the under side of the sleeve 55 on shaft 56, whereby said jaw is made to close against the upper side of the envelope, and said movement of the jaw carries the projection 103 thereon above the point 105 on the latch, letting the latter catch under said projection and lock said jaw, thereby causing the latter to grip and hold the envelope when the jaws move from under said sleeves 55. At the extreme backward movement of said grippers they encounter the pointed gripper-trip 89, Figs. 1 and 10, which is fixed on the side of a standard 88 on table 4, and whose end enters between the latch and bar 101, drawing the latch away from the projection 103 on the rear end of the jaw 102, letting the latter open by the action of spring 106 and leaving the envelope free in said drying-chain.

To prevent the action of the gumming-roller 75 when no envelope is present in the machine by reason of the accidental stoppage of the supply to the lifter 11—whereby if it were allowed to act uninterruptedly gum would be deposited directly on the table 60, Fig. 6, greatly to the hinderance of the work and the waste of envelopes—the below-described stop-motion devices are provided. As before described, the crank-shaft 65 has a rocking motion, and on one end thereof is fixed the disk 90, having the pin 91 projecting therefrom horizontally, which pin has a reciprocating rotary motion corresponding to the movements of said shaft 65. A hook-bar 92, having a curved cam-like projection 107 on one edge, is pivoted on the end of an arm 95, which is fixed on the shaft 79, and by the aforesaid rocking motion of the latter vertical motion is given to the gumming-roll 75, which applies gum to the inner side of the sealing-flap of the envelope while it lies on the said vibrating table 60. The purpose of said stop-motion devices is to cause the rocking motion of said shaft 79 to cease and the roll 75 to remain suspended where no envelope is present, thereby obviating said inconveniences. Said hook-bar moves up and down with the rocking motion of shaft 79 and passes through a slot in a guide 93, and said cam-curve 107 thereon strikes the guide at the end of said slot as it moves, a spring 96 attached to its free end serving to draw the bar toward said end of the slot in guide 93, so that when arm 95 makes a downward movement coincident with the downward movement of the said roll 75 the said cam-curve, by striking said guide, causes the lower end of bar 92 to swing away from the pin 91 in disk 90 and prevent hook 94 from engaging with said pin; but when shaft 79 is to be stopped, as aforesaid, hook 94 engages with said pin before the said cam-projection strikes the guide 93 and arrests roll 75 in an upward position. To effect the stoppage of bar 92 by pin 91, as aforesaid, the hook 97, Figs. 4 and 7, is pivoted by one end to the table 4, and its upper end is connected by a rod 108 to the end of an arm 109 on the shaft 110, the latter having fixed thereon the finger 111. The shaft 110 is hung in a support 112, and has two arms 113 thereon, and the upper ends of two spring-levers 114 are interlocked with said arms and support, as shown. Said spring-levers consist of flexible metallic strips, whose lower ends are engaged with a suitable cam on shaft 17, whereby shaft 110 is given a constant rocking motion, but of weak power, to the end that finger 111, to which shaft 110 imparts a vibrating motion, may be stopped in its movement toward the lifter 11 by an envelope which lies thereon, the said flexible strip which so actuates said finger being capable of sufficient flexure under such light resistance as to produce said effect; but when no envelope is present on the lifter finger 111 freely vibrates in slot 47 in the lifter, thereby permitting shaft 110 to rock correspondingly and the end of arm 99 to so swing as to throw the upper end of hook 97 forward, bringing it in the path of the oscillating movement of the pin 91, and the latter then engages with said hook, whereby it is rigidly held, and the next downward movement of the hook-bar 92 brings its hook 94 against the upper side of said pin, as in Fig. 7, thereby stopping the motion of shaft 79, which would otherwise let the gumming-roll 75 move down as usual against the table 60 and apply gum to that instead of to the seal-flap of the envelope.

What I claim as my invention is—

1. In a machine for gumming and folding envelopes, the blank-carriage 36, having a reciprocating horizontal motion, a blank-supporting arm attached to one end of said carriage and extending between the sides thereof combined with the yoke 42, having a divided folding-box plunger attached thereto, whereby the movements of the latter are not interrupted while the blank-supporting arm extends over the folding-box, substantially as set forth.

2. In combination, the blank-carriage 36, the arm 39, attached to the latter and extending between the sides thereof, the yoke 42, the divided plunger 41, and the shaft 48, provided with two blank-guiding pinions, substantially as set forth.

3. The trough 8, having slots therein, the vibrating feed-arms 9, projecting through said slots, the arms 10, pivoted between said feed-arms and having their free ends moving in said slots in advance of said arms 9, and the curved guide-strip 15, attached under said trough, combined and operating substantially as set forth.

4. The envelope-lifter 11 and means, substantially as described, for giving it a vertically-reciprocating motion, the vibrating crank-shaft 56, the stop-arms 52, secured on said shaft, and the vibrating arms 49, co-operating with the arms 52 to hold the envelope while it is gummed, combined and operating substantially as set forth.

5. As means for gumming the lap-spots on the outside of the seal-flap of the envelope, a crank-shaft 65, having thereon the picker-gummers 66, and means, substantially as described, for imparting a rocking motion to said shaft, combined with the gumming-roller 67 and means, substantially as described, for swinging said roll from the gum-box against said picker-gummers, substantially as set forth.

6. As means for opening out and gumming the inside of the seal-flap of the envelope, the crank-shaft 65, having the picker-gummers 66 thereon, and means, substantially as described, for imparting a rocking motion to said shaft, the vibrating gumming-roller 67, to apply gum to said picker-gummers, the flap-table 60, the gumming-roller 75, and means, substantially as described, for imparting thereto a horizontal and vertical reciprocating motion, whereby it is moved from the gum-box 76 to the seal-flap on said table 60, combined and operating substantially as set forth.

7. The pivoted flap-table 60, gravitating against table 4 and having curved recesses in its edge to receive the picker-gummers, and the picker-gummers 66, combined with the swinging lever 61, engaging under said table 60 and lifting its recessed edge, substantially as set forth.

8. As means for conveying the envelope from the gumming devices to the drying-chain, the vibrating arms 86, each carrying a gripper consisting of a bar 101, having a fixed jaw thereon, a pivoted jaw opening and closing opposite the latter and having a projection 103 thereon, a latch 104, pivoted on said bar and engaging with said projection, and a spring to open jaw 102 and to swing said latch, combined with the sleeves 55 to close said grippers, and the gripper-trips 89, to swing said latch, substantially as set forth.

9. As means for arresting the action of the gumming-roll 75 and preventing the application of gum to the flap-table 60 when no envelope is present, the pin 91, projecting horizontally from a disk on the end of the rocking crank-shaft 65, the curved-edged hook-bar 92, having a hook thereon to engage with the upper side of said pin and suspended on an arm on the rock-shaft 79, to which said gumming-roll is attached, the slotted guide 93, the pivoted hook 97, to engage with the under side of said pin, the shaft 110, having thereon an arm connected with said hook 97, and the finger 111, and means, substantially as described, for imparting a rocking motion to shaft 110, combined and operating substantially as set forth.

10. In combination, the envelope-lifter 11, having a slot in its edge, the rock-shaft 110, the finger 111, having a vibrating motion within said slot, the hook 97, pivoted on the table of the machine, the arm 99, secured on said shaft and connected with said hook by the rod 108, and the rocking shaft 65, having connected therewith the pin 91 for engagement with said hook, substantially as set forth.

11. The rock-shaft 79, having the gumming-roll 75 connected thereto, the hook-bar 92, pivoted on an arm on said shaft and having a curved projection and a hook on one edge, the slotted guide 93, through which said bar passes, and the pin 91, attached to the shaft 65, with which said hook-bar engages, all the elements combined substantially as set forth.

12. In a machine for gumming and folding envelopes, the blank-carriage 36, having a reciprocating horizontal motion, the arm 39, attached to said carriage, the yoke 42, the divided folding-plunger attached to said yoke, the pickers 26 and 27, and suitable gumming devices therefor, the chute 7, to receive the envelope from said gumming and folding devices, the trough 8, to receive envelopes from said chute, and the vibrating arms 9 and 10, to move said envelopes upward in the latter, the vertically-reciprocating envelope-lifter 11, receiving the envelope from said arms, the vibrating arms 49 and 52, to hold the envelope while it is gummed, the rocking crank-shaft 65, having the picker-gummers 66 thereon, the vibrating gumming-roll 67, the flap-table 60, and the horizontally-vibrating gumming-roller 75, and the necessary co-operating adjuncts, all in combination substantially as described.

JAMES BALL.

Witnesses:
G. M. CHAMBERLAIN,
C. C. MOULTON.